3,489,405
APPARATUS FOR STRIP TRIMMING PREPARATORY TO LAP JOINDER
Andrew E. Abramson and Andrew F. Kitchar, Excelsior, Minn., assignors, by mesne assignments, to Research Instruments & Controls, Inc., a corporation of Minnesota
Original application Jan. 24, 1966, Ser. No. 522,752, now Patent No. 3,354,769, dated Nov. 28, 1967. Divided and this application Oct. 23, 1967, Ser. No. 704,192
Int. Cl. B25b 11/00
U.S. Cl. 269—21                                5 Claims

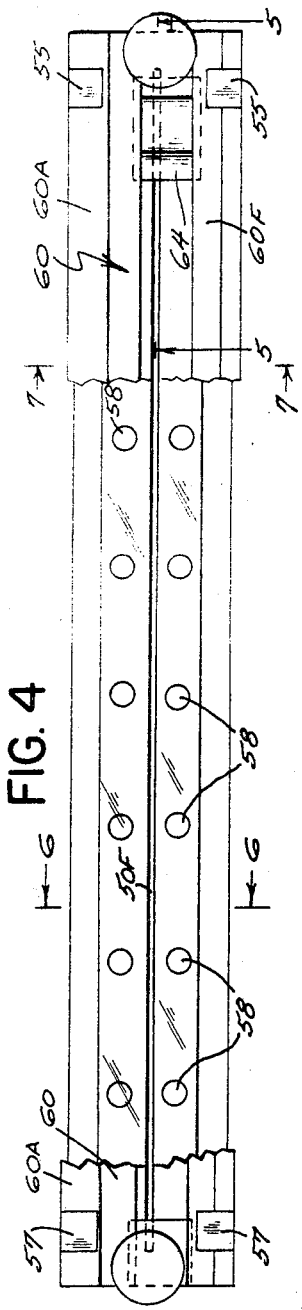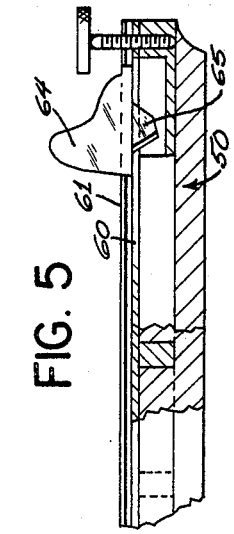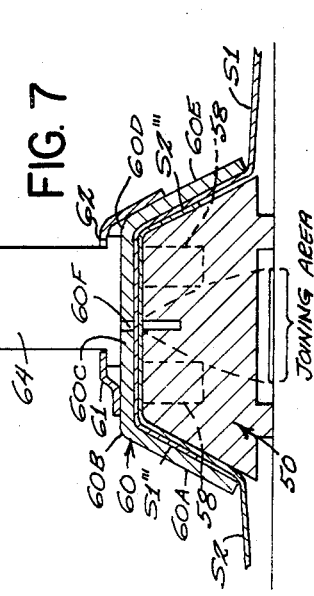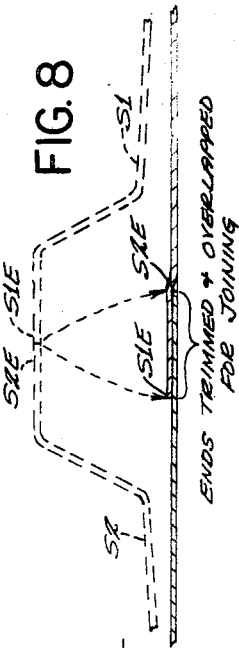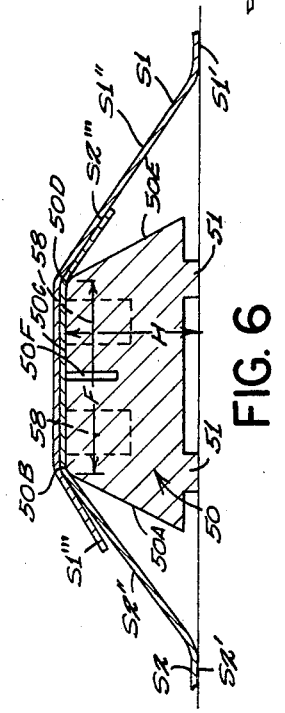
INVENTORS
ANDREW E. ABRAMSON
ANDREW F. KITCHAR
BY Dugger, Peterson, Johnson & Westman
ATTORNEYS United States Patent Office 3,489,405
Patented Jan. 13, 1970

ABSTRACT OF THE DISCLOSURE

For trimming the ends of aligned strips preparatory to lap joining, a support member having a work surface portion and first and second apertured surface portions on either side of the work surface portion together with adjustable guides having air blocking material attached so that the blocking material will be wound or unwound from spring actuated rollers to block selected areas of apertures of the respective first and second portions. Vacuum is applied to the apertures to hold strips. The guides are provided to align a pair of strips. On the work surface portion there is provided an under member and an upper member for holding the strips as a knife member mounted on the upper member is moved along a slot in the lower member to trim the strips.

---

This is a division of application Ser. No. 522,752, filed Jan. 24, 1966 now Patent No. 3,354,769.

This invention relates to apparatus for trimming the ends of strips of material preparatory to lap joinder, and especially to apparatus for accomplishing such results when the strip material is plastic material and joinder is effected by heat welding at the lap.

It is an object of the invention to provide an apparatus for quickly and neatly severing the ends of aligned strips of material for preparing neat and uniform laps, preparatory to joinder. It is another object of the invention to provide an apparatus for holding aligned strips of material with their ends overlapped, and while being so held to neatly sever the ends of the lapped strips in the exact position so as to provide a lap of predetermined amount preparatory to joinder.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURE 3 is a perspective view, of the same apparatus as shown in FIGURE 2, with portions broken away to show the interior components of the present invention, and with other components of the present invention placed on the table (or platform) of the strip joining machine;

FIGURE 4 is a plan view, partly broken away, of the strip trimming apparatus component of the invention;

FIGURE 5 is a sectional view taken along the line and in the direction or arrows 5—5 of FIGURE 4;

FIGURE 6 is a sectional view taken along the line and in the direction of arrows 6—6 of FIGURE 4, showing the strips of material, which are to be joined, loosely positioned on the under-member of the trimming apparatus;

FIGURE 7 is a sectional view taken along the line and in the direction of arrow 7—7 of FIGURE 4 which shows the trimming apparatus component of the invention assembled, preparatory to trimming of the strips for lap joining; and FIGURE 8 is a diagrammatic view, showing in dotted lines the configuration of the ends of the strips, after trimming but in the position as held by the trimming component of the invention, and in full lines illustrating the resultant lap of the strips preparatory to joining.

Throughout the drawings, the same numerals refer to the same parts.

Figure 1:
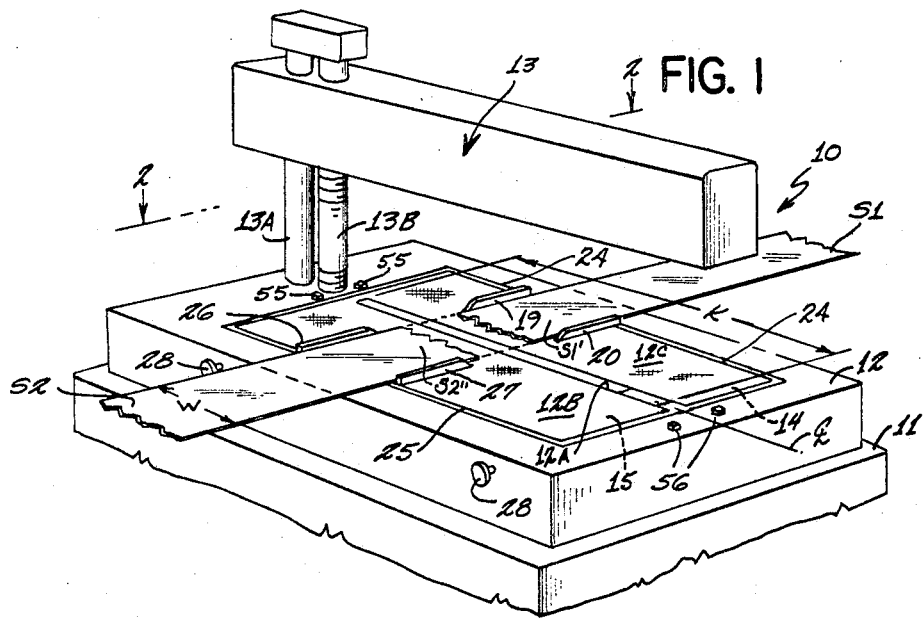
FIGURE 1 is a fragmentary perspective view of an exemplary embodiment of lap joining machine, in which the apparatus of the present invention is incorporated and forms a part, for preparing the strips preparatory to the lap joining of the strips.

Referring to the drawings, the lap joining machine may be of any form suitable for the joining of strips, and the type of machine that is used will vary, depending upon whether the strip material is of plastic, cloth, or other materials. In the embodiment shown in FIGURE 1 is illustrated generally at 10 a lap joining machine, of the type specifically illustrated in our co-pending application, Ser. No. 522,786 filed Jan. 24, 1966 and entitled "Method and Apparatus for Lap Joinder of Plastic Sheets," but it will be understood that insofar as the mode of joinder of the strips is concerned, that in this invention the method and machine by which the ends of the strips are joined may be varied widely. For example, as another type of lap joining machine for plastics which may be utilized there may be used the machine shown in our co-pending application, Ser. No. 484,545, filed Sept. 2, 1965, now Patent No. 3,384,526, and entitled "Machine and Method for Joining Plastics." The disclosures of the aforesaid applications are incorporated herein by reference, as illustrations of kinds of machines which may be used for welding plastic strips for joining them together.

Referring specifically to the machine shown in FIGURE 1, it contains a machine stand at 11 and a table or platform 12 which is generally in the form of a shallow rectangular box which presents a work surface on its upper face. At a central area illustrated by the rectangle 12A there are devices which in cooperation with head 13 (when lowered) will generate heat for accomplishing the heat welding of plastic materials that are laid across this area. The heat generating device (or devices) are not illustrated in detail herein, but can be constructed as described in our applications aforementioned. The strips S1 and S2 which are to be joined, may therefore have a width dimension W which is any width desired up to the dimension K of the heat welding area and this dimension can be varied to suit needs. In the illustration of FIGURE 1, the strips S1 and S2 which are of equal width W are somewhat narrower and hence utilize only a portion of the dimension K of area 12A. In the machine shown in FIGURE 1, the head 13 is a part of the heat welding machine and is supported on post 13A and is raised and lowered (and partly supported) by screw 13B, all as shown in our application filed of even date herewith, to which reference is made for details of one form of lap joining machine.

Outside of the effective welding area 12A, are arrangements in the areas 12B and 12C forming a part of the present invention, the purpose of which is to hold the strips S1 and S2 while work is done on them. As these can be identical, one on each side of area 12A, only one such area 12C is described in detail.

Referring to FIGURE 3, these areas 12B and 12C are each composed of flat topped boxes as at 14 for area 12C and 15 for area 12B. The top surface of each box is made of fine screen 16 or similar surface which permits air to pass therethrough, and this is in turn supported flat and level by apertured plate 17 at an elevation such that the top surface of each box 14 and 15 is smooth and level with the top surface of box 12. The screen surface 16 will permit air to pass downwardly through it. Each box is otherwise closed and each is provided with a vacuum connection as at 18 for box 14, which may be connected to an external vacuum source for inducing a slight negative pressure within the box. A separate vacuum control, as at 18A for box 14, is provided for each box 14 and 15. As an alternate construction each box 14 and 15 may have a built-in motor driven exhaust fan with switch for controlling the fan. Any part of screen 16 of box 14 or of box 15, which will therefore have air drawn downwardly therethrough, and the strip material to be joined, when resting on such surface, will be held down by the slight negative pressure imposed on it by the atmosphere, thus nicely holding the strip ends S1 and S2 in place.

The alignment of the strips S1 and S2 is primarily determined by other machinery, such as supply reels and take-up reels of winding machines not shown, and strips S1 and S2 may therefore be assumed to be in or substantially in alignment. The edges of the strip, during the joining operation, are accurately aligned and positioned by guides 19 and 20 for box 14 and 26 and 27 for box 15. These guides each have a portion extending across the top of the box as illustrated and each has a downwardly extending portion as at 19A and 20A which rests against the sidewall of the box, as at sidewall 14A and these downwardly extending portions are adapted to be pressed against the sidewall by a clamp bar as at 21 for box 14 which is in turn pressed towards the box by two screws 22—22 threaded through the outer wall 12A of the platform 12 of the strip joining machine. When the two clamp screws 22—22 are loosened, the guides 19 and 20 may be translated along the slot 24 with portions 19A and 20A extending therein, so as to position the guides 19 and 20 to precise alignment with the edge of the strip S1, and then the guides, once positioned, are locked in place by turning down the screws 22—22 which press against the bar 21 and hold the downwardly extending portions 19A–20A firmly against the side 14A of the box 14. The box 15 is similarly constructed and is provided with guides 26 and 27 having downwardly extending portions 26A and 27A respectively which extend into the slot 25, and the guides 26 and 27 may likewise, once adjusted, be similarly locked in place by tightening the screws 28—28, which hold a clamp bar not shown.

At opposite ends of the box 14 (and similarly for the box 15) there are provided rollers 29 and 30 upon which are wound strips of cloth 31 and 32 which is impervious to airflow therethrough. These cloths extend up toward the top of the box and pass through the slots 33 and 34 at opposite ends of the box, and thence onto the flat upper surface of the screen 16 of which the top of the box 14 is composed. The strip 31 is attached to the underedge of the guide 20 and the strip 32 is attached to the underedge of the guide 19. Each of the rollers 29 and 30 is provided with a retracting spring as at 35 for the roller 29 and 36 for the roller 30, so that the roller always exerts a tension on the cloth to wind it on the roller. Thus roller 29 will exert a slight tension on the cloth 31 and similarly the roller 30 will exert a slight tension on the cloth 32. This keeps the cloth tight against the top screen wire surface 16 of the box 14. The springs 35 and 36 are preferably of the type which exert a constant tension, regardless of whether a large amount or a small amount of strip 31 or 32 is wound on the roller. The cloth strips 31 and 32 serve to cover and hence block the flow of air downwardly through those portions of the screen wire top of the box 14 which are outside the central area between the guides 19 and 20 where strip S1 is being held and hence the vacuum pulled on the box via inlet 18 is exerted with full effectiveness upon only the area exposed between the guides, and consequently strip S1, which is positioned between these guides, is held firmly in position.

Similarly for the box 15 there is provided an impervious cloth strip 37 which passes through the slot 38 and is arranged to be wound on a spring retracted roller, not shown. This strip is attached to the underside of the guide 27. Likewise there is an impervious cloth strip at 39 which passes through the slot 40 and is likewise arranged to be wound on a spring retracted roller not shown, within the platform box 12. The strip 39 is attached to the underedge of guide 26. Vacuum is similarly applied to the box 15 and its surface, being also composed of a screen wire, supported by an apertured plate, thereby imposes the vacuum on the area between the guides 26 and 27 and hence firmly holds strip S2 positioned between the guides.

In this way the two strips S1 and S2, which are assumed to be primarily aligned by other machines not shown, are then accurately aligned and held very effectively, and ready to be trimmed prior to having their ends attached. Each strip is, in turn, positioned by hand, the fences are adjusted and the vacuum (for that strip) is turned on and the strip thereby held.

Referring to FIGURES 2–8 particularly, the trimming apparatus component consists of a lower bar 50 which is sufficiently long so that it extends throughout and slightly beyond the length K of the machine 10. This bar 50 has little feet at 51 on its underside which are high enough so as to hold the bar slightly above the central area 12A, so as not to damage equipment in area 12A, and at the ends of the bar 50 there are provided notches at 52—52 and 54—54 of a size and shape so as to register with upwardly protruding pins at 55—55 on the rear portion of the machine 10 and 56—56 on the front portion of the machine. Hence the bar 50 may be placed on the upper surface of the box of platform 12 and is located by means of the pins 55–56. The bar is normally located so as to be normal to the length of the strips S1 and S2, but can obviously be located in any orientation desired, depending whether a lap is to be at right angles to the length of the strip or at some other angle. In the bar 50 there are recessed a plurality of magnets 58—58 which have the purpose of providing a downward pull on the upper member 60 of the cutting apparatus. It will be noted that the upper member 50 has an upward slope at 50A which blends at smoothly rounded corner 50B to a flat top surface 50C which blends at smoothly rounded corner 50D to a downward slope 50E. The dimensions of the slopes 50A and 50E and the width from the rounded corner 50B to the rounded corner 50D likewise is chosen so as to provide the desired amount of lap for strips S1 and S2. At the center of the bar 50 there is a slot 50F which extends nearly to the ends of the bar, and somewhat beyond dimension K, at each end.

Figure 2:
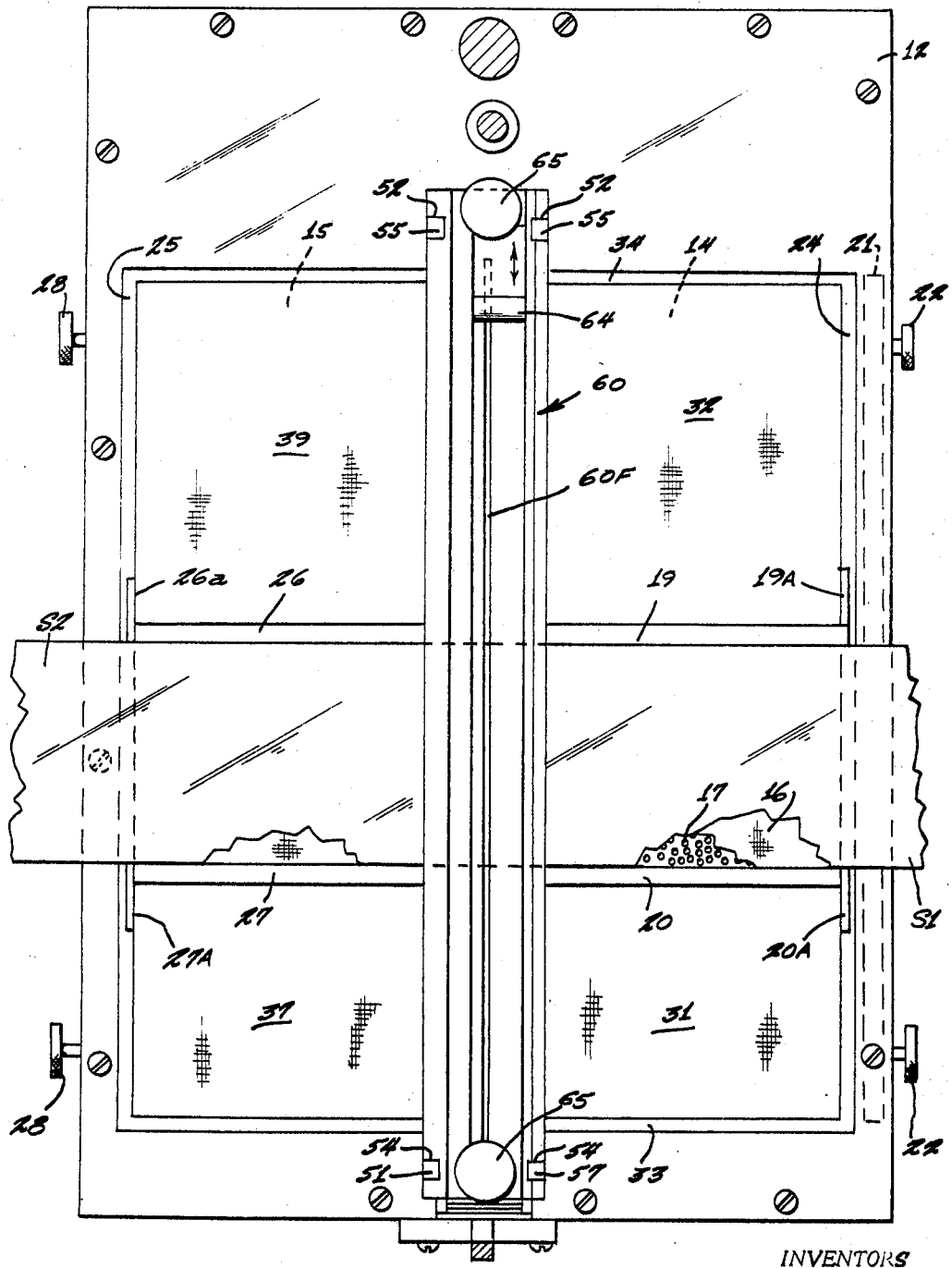
FIGURE 2 is a plan view, partly in section, taken at the level and in the direction of arrows 2—2 of FIGURE 1 illustrating the table (or platform) of the strip joining machine shown in FIGURE 1, and illustrating portions of the apparatus of the present invention placed thereon for severing the ends of the strips, preparatory to lap welding of the ends together for joinder of the strips.

The upper member 60 of the cutting device is a V-shaped channel of ferrous material having side flanges 60A which are smoothly rounded at 60B to blend into a top surface 60C which extends across to the smoothly rounded corner 60D which blends into the flat sloping side surface 60E. The angularity of the downwardly sloping flanges 60A and 60E and the distance between the bends at 60B and 60D are such that the entire upper member 60 can be nested down upon the upper surface 50A–50E of the member 50 of the cutting device when the two layers of strips S1 and S2 are between them. The upper member 60 likewise has a slot at 60F which mates in position and length with the slot 50F of the member 50. It will be noted that slot 60F does not extend all the way to the ends of the member 60. On each side of the slot 60 there are shaped guides 61 and 62 into which the lower flanged ends of a knife carrier 64 are adapted to extend and slide. The knife carrier can be moved from end-to-end of the members 50–60, by sliding it along the space between the guides 61 and 62. As shown in FIGURE 5 the knife carrier 64 is provided with a downwardly extending slant-edge knife 65. The members 50 and 60 are of such length that the slots 50F and 60F are long enough that the knife carrier 64 can be moved to one end, to a "parking position" which is shown in FIGURE 2, to allow the knife 65 to be slightly beyond the (rear) edge of the widest strip of material that is to be trimmed.

At opposite ends of the member 60 there are provided screws 65–65 which extend down and (when screwed down) engage the upper surface of the member 50. These screws are normally retracted (screwed up) when the upper member 60 is in place on the lower member 50 and consequently the magnets 58–58 will then exert a maximum pull downwardly on the upper member 60 when this occurs. In order to initiate the removal of member 60, the screws 65 are turned down and they lift member 60 away from member 50 thereby releasing it from the attractive pull imposed by the magnets 58. It will be noted from FIGURES 2 and 4, that the members 60, at opposite ends is provided in its flange 60A and 60E with notches registering with the rectangular pins 57–57, but aside from the magnetic attraction afforded by the magnet 58, there is nothing else which holds the member 60 downwardly on the member 50.

In use, a sufficient length of strips S1 and S2 are arranged so that they will extend well beyond the central area 12A of the machine 10, the strips S1 and S2 being aligned by guides 19–20 and 26–27 and held by vacuum as previously described. Then, the ends of the strips are folded back slightly, sufficiently to put in place the member 50 of the cutting apparatus, and then these ends S1E and S2E are lapped over the member 50 as shown in FIGURE 6. The downward pull imposed by the vacuum of the boxes 14 and 15 will hold the portions S1' and S2' of the strips in place but the overlapping ends will slope upwardly as at S1'' and S2'' and will then rest across the upper surface 50C of the member 50 of the cutting apparatus and then slope downwardly at their free ends S1''' and S2''', one end on each side, as illustrated in FIGURE 6. Then the upper member 60 of the cutting apparatus is put in place, registering with the pins 55–57 and the magnets 58 pull the member 60 firmly downwardly since it is assumed that the screws 65 are now screwed upwardly so that they do not engage member 50. When this occurs the member 60 will conform the strips S1 and S2 to the positions shown in FIGURE 7 and the ends S1''' and S2''' are drawn back slightly as they conform to the shape 50A–50E, this shape being imposed by the under surface 60A–60E of the member 60. Then the knife carrier 60 is drawn down its guides, and the knife 65 (which reaches into the aligned slots 50F–60F) will simultaneously cut through both strips, throughout their full width producing ends S1E and S2E as shown in dotted lines in FIGURE 8. The screws 65 are then turned down, and this lifts member 60, and it can then be lifted off. Then the member 50 of the cutting apparatus is likewise lifted off table 12 the ends S1E and S2E being sufficiently displaced at this time so as to permit the upward removal of member 50. These ends S1E and S2E which have a position as shown in dotted lines in FIGURE 8 when cut, will then move down into the full line position of FIGURE 8, thereby neatly overlapping the amount shown.

The amount of overlap can be changed by changing the dimensions of the surfaces 50A–50E and 60A–60E. The higher the dimension H of the member 50, see FIGURE 6, and the greater the width F, the greater will be the overlap in the ends of the strips produced. If only a slight overlap is desired the dimensions H and F (preferably the latter dimension H) is reduced. If a greater overlap is desired the dimensions can be increased. In any event, the amount of overlap is thus determined by the configuration of the members 50 and 60, and can be selected to suit the needs. Once in overlapped position, the attachments of the overlapped ends of the strip is made either by sewing, heat sealing, or adhesives, depending upon the particular mode of joining and the type of material that is being joined.

As many widely apparently different embodiments of this invention may be made without departing from the spirit and scope thereof, it is to be understood that we do not limit ourselves to the specific embodiments disclosed herein.

What is claimed is:

1. A machine for holding the ends of strips of sheet material during the performance of work operations on said strips comprising a support member having a first surface portion, a second surface portion and a third surface portion between the first and second surface portions to provide a work area between the first and second surface portions for performing work operations on said strips, the first and second surface portions each having a surface substantially coplanar with the other, the first and second surface portions having scattered apertures throughout its respective area to permit air being drawn downward substantially uniformly across the respective surface, vacuum manifold means joined to said surface portions and opening to said apertures for drawing air downwardly through said apertures, controllable means for applying vacuum to said manifold means, and means for blocking airflow through the apertures of a selected portion of the first and second portions whereby airflow may be blocked through the apertures that are not covered by the strips on which a work operation is to be performed, said blocking means including a strip of air flow blocking material having a first end portion and a second end portion, a spring actuated roller having said first end portion attached thereto for having said blocking material wound therearound and first means mounted by the support member and having the second end portion attached thereto to retain the material over the selected apertures.

2. The apparatus of claim 1 further characterized in that the blocking means includes a second spring actuated roller, a second strip of air blocking material having an end portion attached to the second roller and second first means having the second strip attached thereto, and that each of the first means comprises an adjustably positionable guide extending over said first and second surfaces and attached to the respective strip of air blocking material for manipulating the respective strip of air blocking material and adapted for facilitating the alignment of the strips on which a work operation is to be performed, said guide means being spaced to have apertures of each of the first and second portions opening therebetween.

3. The apparatus of claim 2 further characterized in that the first spring actuated roller is mounted on the first surface portion remote from the third surface portion and that the second spring actuated roller is mounted on the second surface portion remote from the third surface portion 4. A machine for holding the ends of strips of sheet material durnig the performance of work operations on said strips comprising a support member having a first surface portion, a second surface portion and a third surface portion between the first and second surface portions to provide a work area extending between the first and second surface portions for performing work operations on the above mentioned strips, the first and second surface portions each having a surface substantially coplanar with the other, the first and second surface portions having scattered apertures throughout its respective area to permit air being drawn downward substantially uniformly across the respective surface, vacuum manifold means joined to said surface portions and opening to said apertures for drawing air downwardly through said apertures, controllable means for applying vacuum to said manifold means, and means for blocking airflow through the apertures of a selected portion of the first and second portions whereby airflow may be blocked through apertures that are not covered by the strips on which a work operation is to be performed, said blocking means including a plurality of strips of air flow blocking material having first end portions and second end portions, first adjustable guide means mounted on the support member to extend across the first and second surface portions and attached to the first end portion of at least one strip of blocking material to move the attached blocking material over selected areas of apertures of the first and second surface portions, second adjustable guide means mounted on the support member to extend across the first and second surface portions in spaced relation to the first guide means and attached to the first end portion of at least one strip of blocking material other than that attached to the first guide means to move the attached blocking material over selected areas of apertures of the first and second surface portions on the opposite side of the first guide means from the blocking material attached to the first guide means to leave uncovered apertures on the first and second surface portions intermediate the first and second guide means, said first and second guide means being provided for aligning strips of material on which a work operation is to be performed, and first means mounted on the support and attached to the strips of blocking material second end portions to act in cooperation with the guide means for retaining the blocking material over the apertures in the selected areas to block the flow of air therethrough.

5. The apparatus of claim 4 further characterized in that the first means comprises rollers rotatably mounted on the support member and having the blocking material second end portions attached thereto.

References Cited

UNITED STATES PATENTS

| | | | |
|---|---|---|---|
| 2,572,640 | 10/1951 | Lovegrove | 269—21 X |
| 2,983,241 | 5/1961 | Morganstern | 269—21 X |
| 3,004,766 | 10/1961 | Bryant | 279—3 |

ROBERT C. RIORDON, Primary Examiner

L. GILDEN, Assistant Examiner